W. S. SOUTHWICK.
LOOM.
APPLICATION FILED MAY 6, 1915.

1,214,966.

Patented Feb. 6, 1917.
9 SHEETS—SHEET 1.

Witness:
H. C. Bowser.

Inventor:
William S. Southwick,
by Wright Brown Quimby Way
Attorneys.

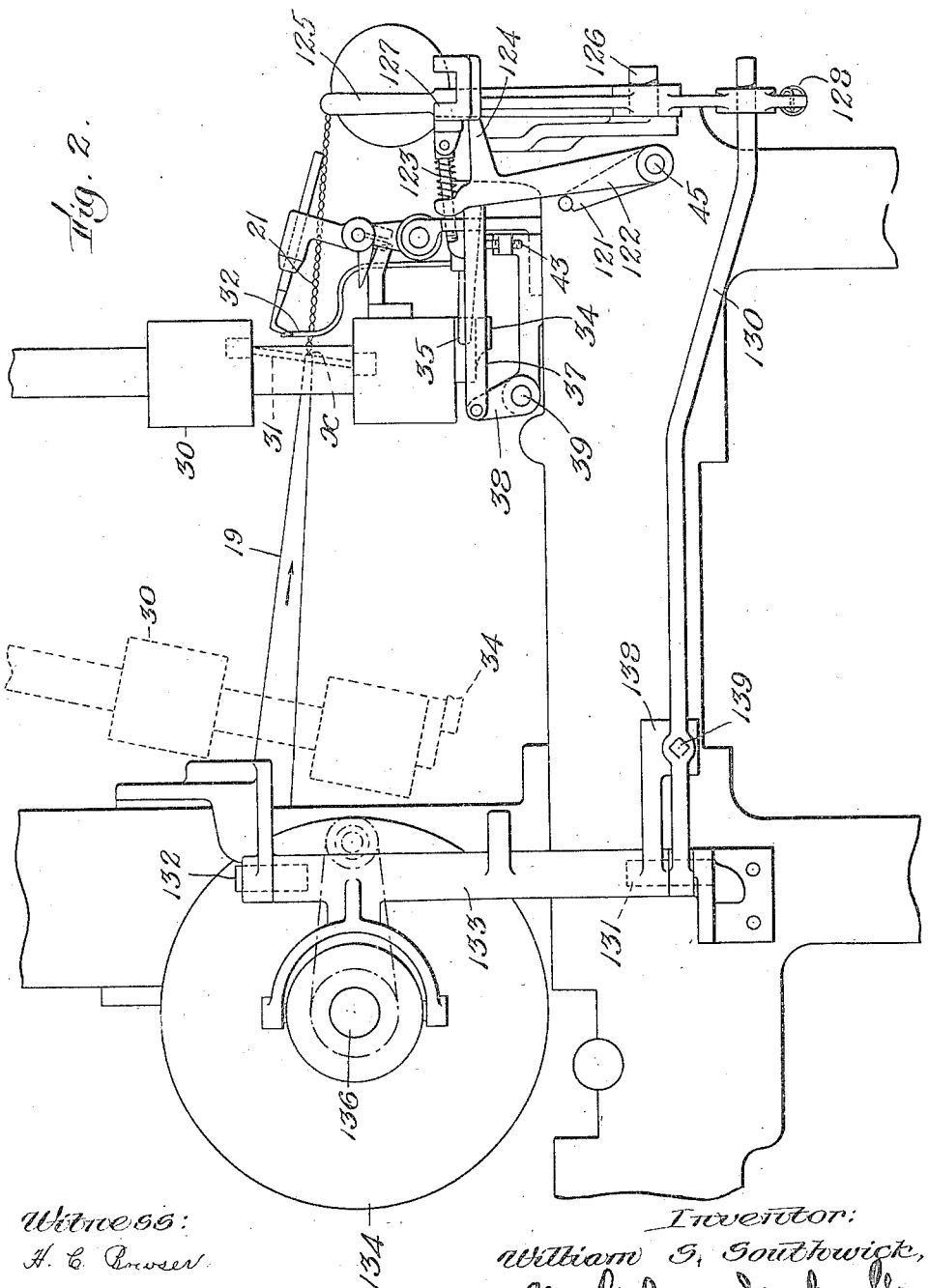

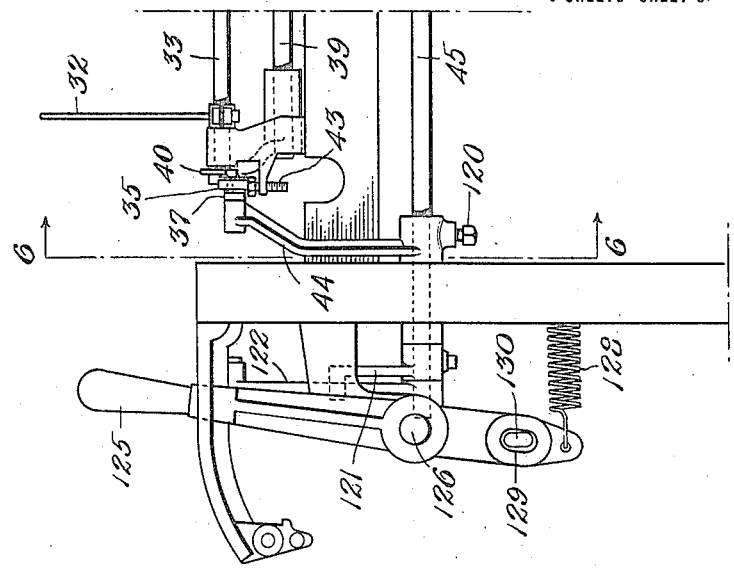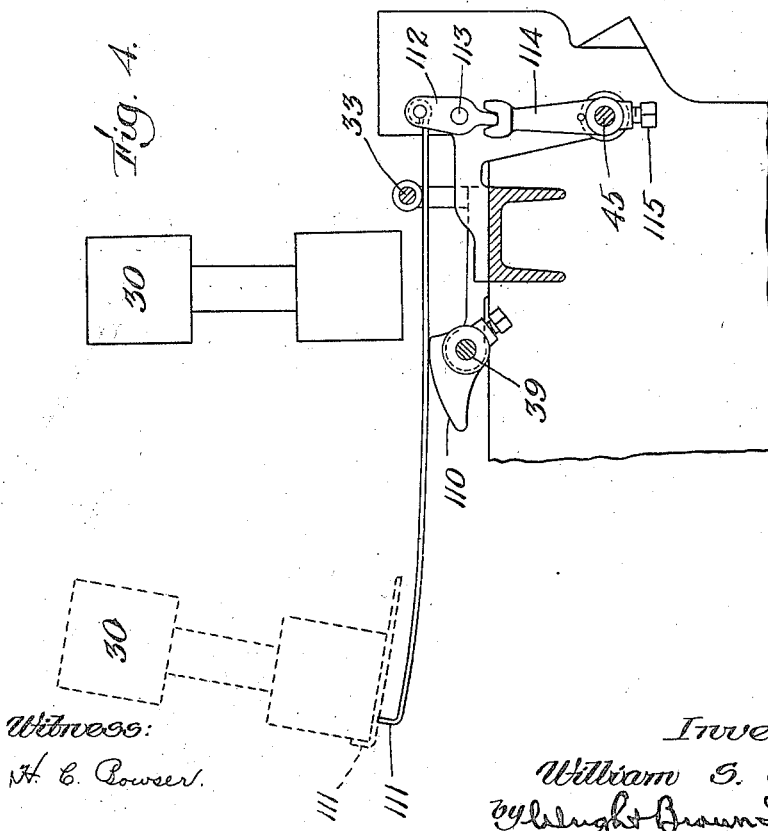

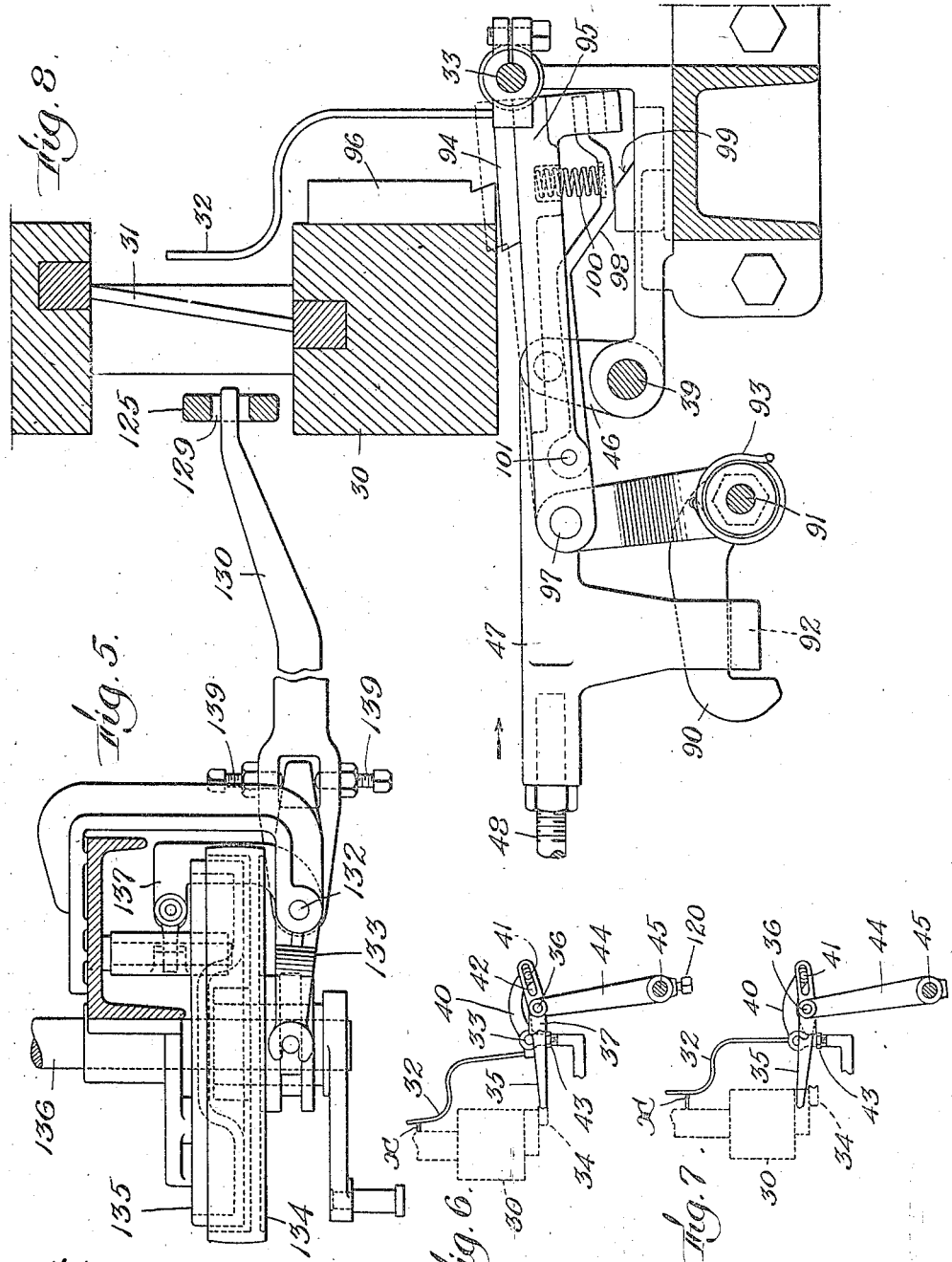

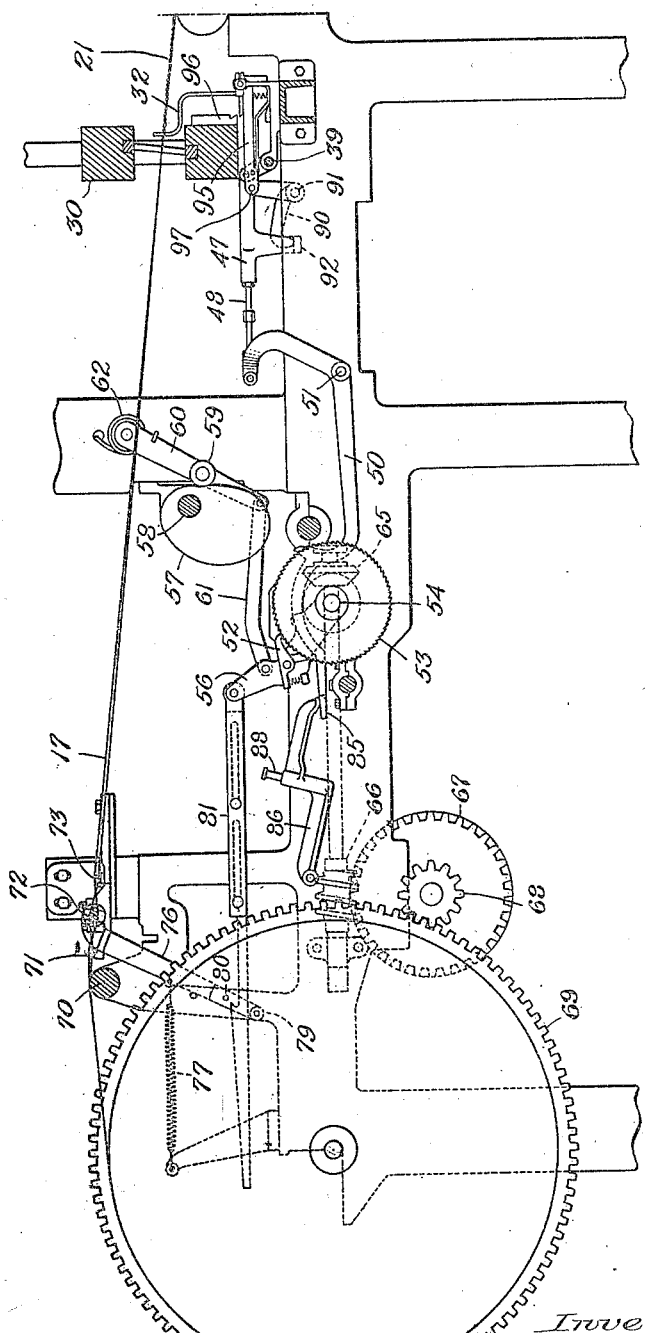

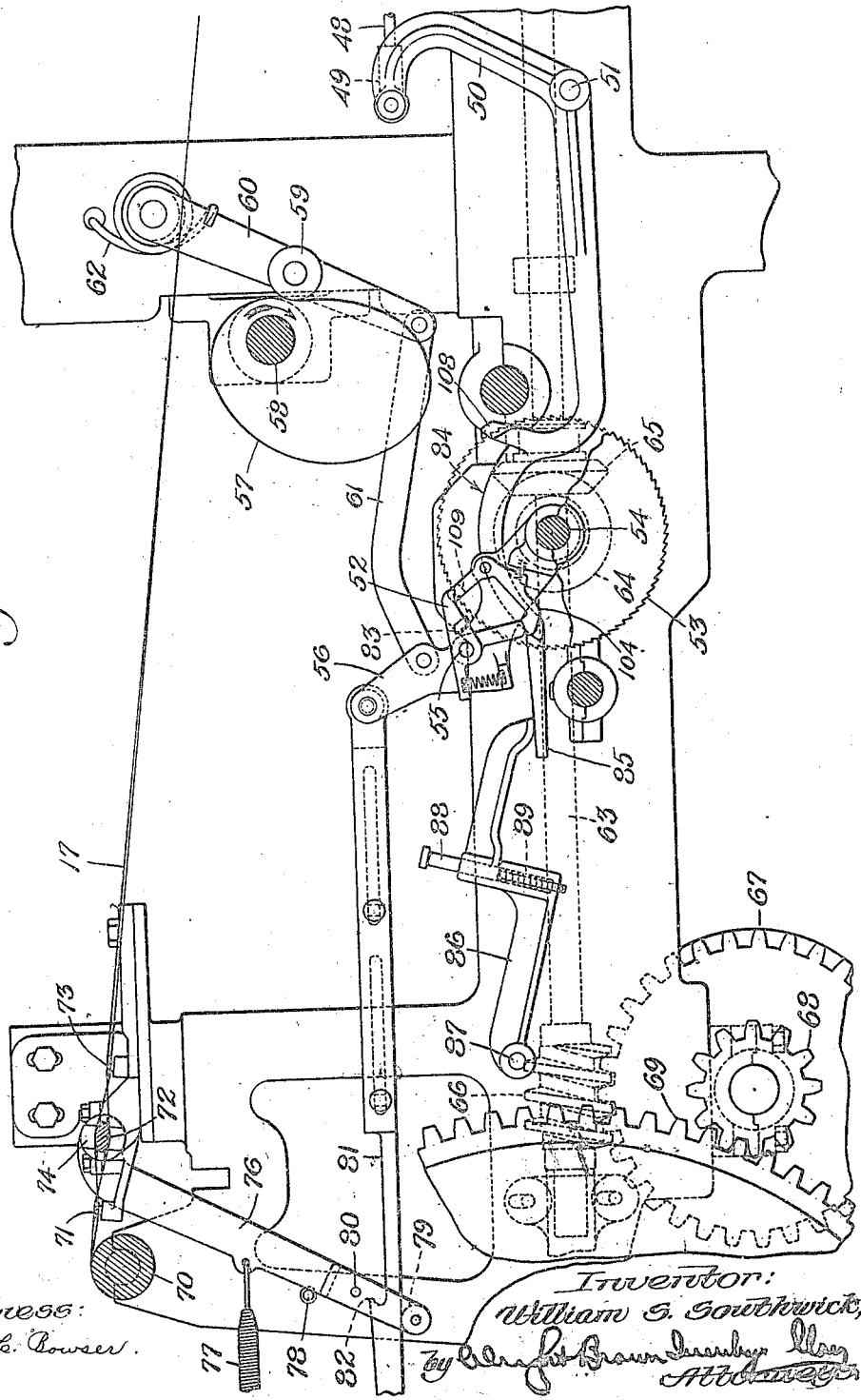

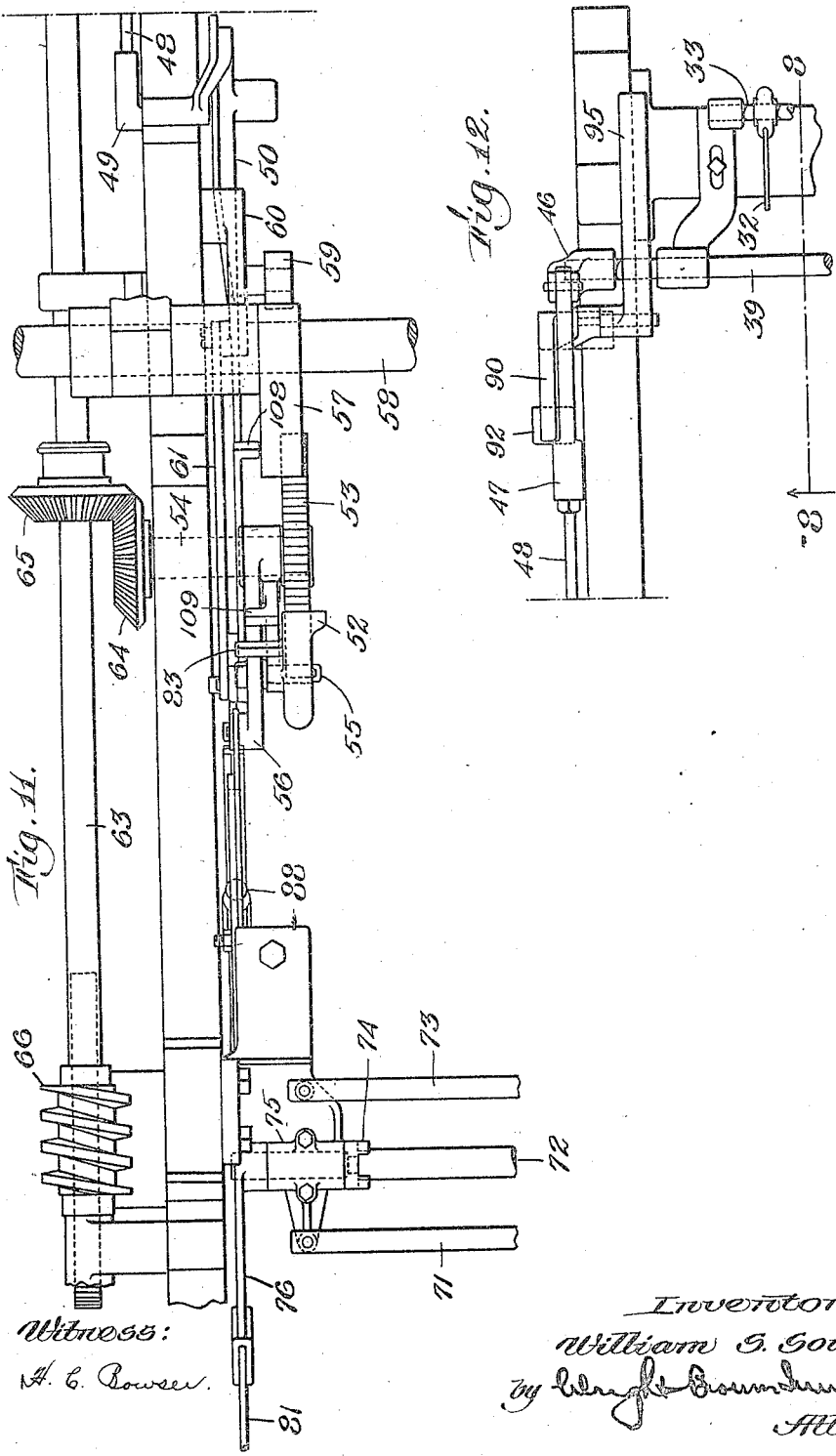

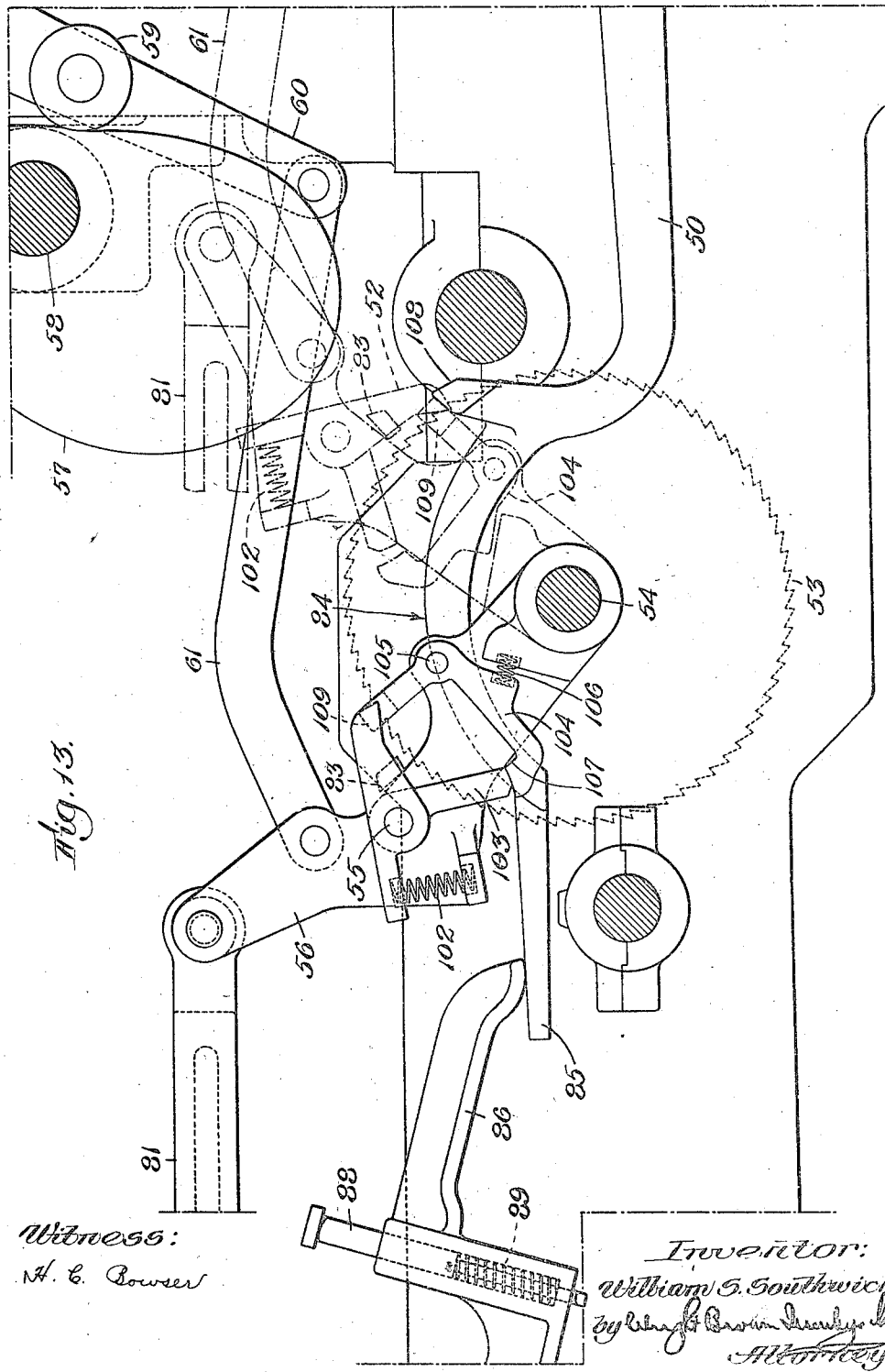

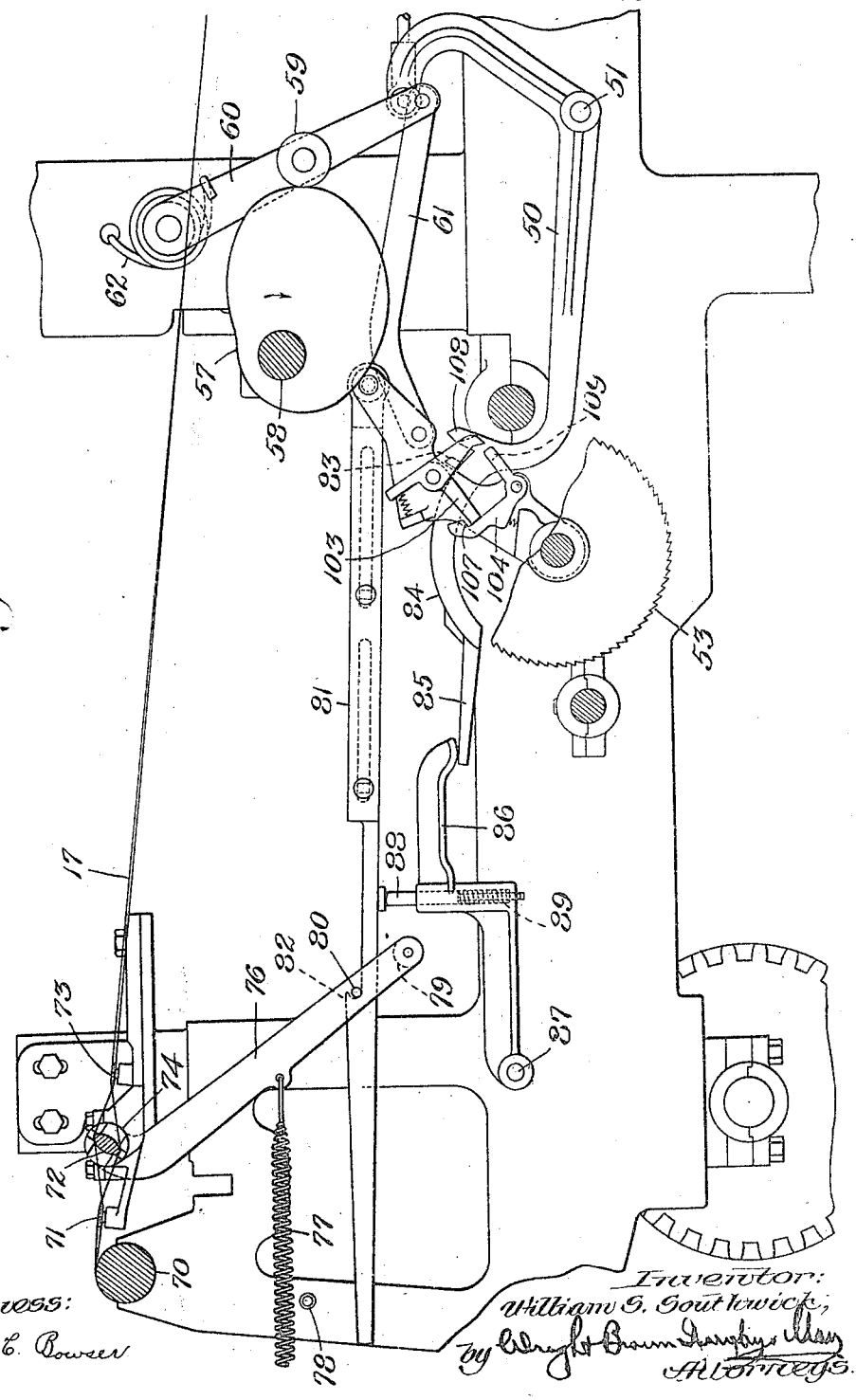

UNITED STATES PATENT OFFICE.

WILLIAM S. SOUTHWICK, OF CLINTON, MASSACHUSETTS, ASSIGNOR TO CLINTON WIRE CLOTH COMPANY, OF BOSTON, MASSACHUSETTS, A CORPORATION OF MASSACHUSETTS.

LOOM.

1,214,966.  Specification of Letters Patent.  Patented Feb. 6, 1917.

Application filed May 6, 1915. Serial No. 26,329.

*To all whom it may concern:*

Be it known that I, WILLIAM S. SOUTHWICK, a citizen of the United States, and resident of Clinton, in the county of Worcester and State of Massachusetts, have invented certain new and useful Improvements in Looms, of which the following is a specification.

This invention relates to looms, and especially to those which are used in the manufacture of wire fabric. The object of the invention is to automatically reverse the direction of movement of the fell whenever the filling breaks or new filling is required, to the end that the woven fabric may be in the desired position to receive the first pick of filling after the broken or incomplete pick has been removed.

My copending application, Serial No. 802,930, filed November 25, 1913, illustrates, describes and claims mechanism for accomplishing the same purpose as that of the present invention. In my former application the reverse movement of the fell is caused by reverse rotation of the warp beam. My present invention differs from my former invention in the mechanism by which the reverse movement is imparted to the fell, such movement, in the present instance, being caused by mechanism which acts upon the warp members between the warp beam and the fell, thus dispensing with the necessity of turning the warp beam backwardly.

Of the accompanying drawings, which illustrate the present invention:

Fig. 2 represents an elevation of a portion of the left end of a loom for weaving wire fabric.

Fig. 3 represents a front elevation of the mechanism at the right of Fig. 1.

Fig. 4 is a vertical section in a plane from front to rear of a modification.

Fig. 5 is a top plan view, partly in section, of the clutch mechanism which drives the loom.

Fig. 6 is an elevation of the mechanism indicated by line 6—6 of Fig. 3.

Fig. 7 is an elevation of the same mechanism as that of Fig. 6, showing the parts in different positions.

Figure 1:
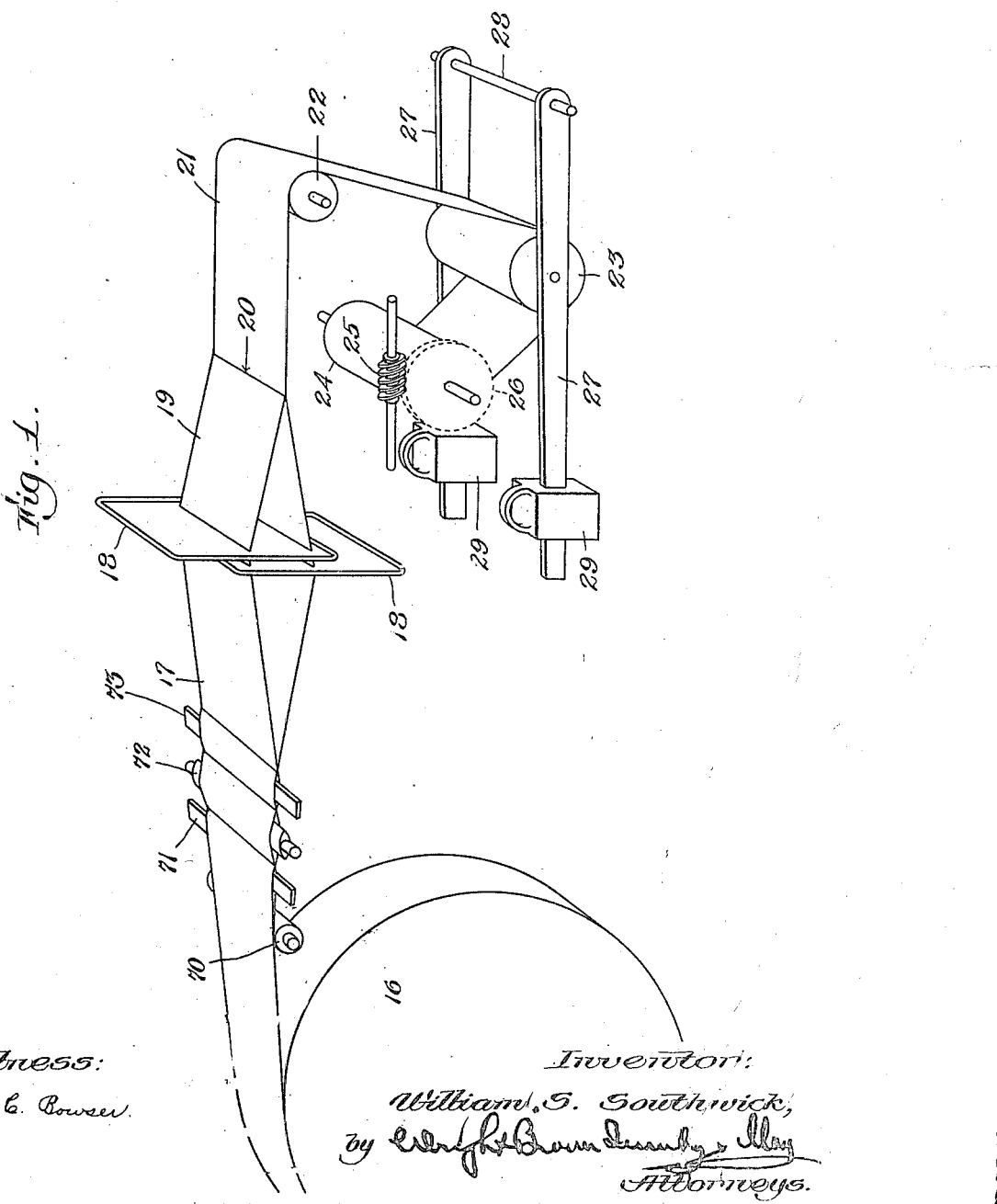
Figure 1 is a perspective view, conventional in some respects, including the warp beam, heddles, warp, woven fabric and take-up mechanism.

Fig. 8 is a vertical section of the mechanism indicated by line 8—8 of Fig. 12. The same mechanism appears at the right of Fig. 9. Figs. 9 and 12 agree as to the position of parts, but Fig. 8 shows such parts in another position.

Fig. 9 represents a vertical section, from front to rear, including the warp beam, lay, and the mechanism by which the fell is moved backwardly. This figure shows the several parts in their normal positions, as when the loom is running in the usual manner.

Fig. 10 is a view similar to Fig. 9, on a larger scale, showing the fell-reversing mechanism in the same position as in Fig. 9.

Fig. 11 is a top plan view of the mechanism shown in Fig. 10.

Fig. 12 is a top plan view of the mechanism which would appear at the right of Fig. 11 if the latter were extended.

Fig. 13 illustrates, on a larger scale, the mechanism which is substantially in the center of Fig. 10, some of the parts being shown in two positions by solid lines and broken lines respectively.

Fig. 14 is a view similar to Fig. 10, showing the parts in the positions required to move the fell backwardly.

The same reference characters indicate the same parts wherever they occur.

Referring first to Fig. 1, the warp beam is indicated at 16. The warp members 17 pass from the warp beam through any suitable heddles, such as those indicated at 18, whereby the shed 19 is formed. The fell is indicated at 20, and the woven fabric at 21. The latter passes over a roll 22, under a roll 23, and thence to a take-up roll 24. The latter is driven, in the present instance, by a worm 25 and gear 26, the latter being fastened to the roll 24. The roll 23 is mounted in two arms 27 whose forward ends are arranged upon a rod 28 and whose rear ends are movable up and down. Weights 29 are mounted upon the rear ends of the rods for the purpose of applying suitable tension to the fabric and to the unwoven warp members. The warp beam 16 is driven by suitable mechanism, hereinafter explained, so as to let off the warp step by step at the required speed, and any variation between the speed of the let-off and the speed of the take-up is cared for by the weighted roll 23 which may move up and down. The roll 23 may rise in response to the action of the fell-reversing mechanism hereinafter described.

Referring now to Figs. 2, 6 and 7,—the last pick of filling is indicated at x, the lay 30, which swings about an axis above the shed, is shown in the act of beating up the pick x, the lay being shown in its extreme forward position. The reed is indicated at 31. The filling coacts alternately with two weft detectors 32 during the beating up operation. These weft detectors are disposed at opposite sides of the fabric, close to the selvages. They are affixed to a rockshaft 33, and they normally stand in the position shown by Fig. 6. Each new pick of filling in the process of being beaten up engages one of the detectors 32 and tilts the latter from the position shown by Fig. 6 to the position shown by Fig. 7; but if the filling breaks or is exhausted, the lay may swing forward without removing the detectors 32 from the position shown by Fig. 6. In such case a striker 34, fastened to the under side of the lay, engages a bunter 35 and moves the latter forwardly. Such movement of the bunter is transmitted through pivot pin 36 to a link 37 (Fig. 2), and by the latter to an arm 38 affixed to a rockshaft 39. The mechanism which is affected by turning the rockshaft 39 will be hereinafter described.

Referring again to Figs. 6 and 7,—an arm 40 is affixed to rockshaft 33. The free end of said arm carries a pin 41 which occupies a slot 42 formed in an extension of the bunter 35. The bunter normally bears upon a rest 43 which is shown in the form of a screw, and is adjustable for the purpose of causing the rear end of the bunter to register with the striker 34. When either one of the detectors 32 is moved forwardly by a new pick of filling, such movement is transmitted to the bunter through the arm 40 and the pin-and-slot connection, thus raising the rear end of the bunter so that it will clear the striker 34 as shown by Fig. 7. In this manner coaction between the bunter and striker is prevented. The slot 42 is of sufficient length to enable the bunter to move forwardly in response to the action of the striker 34. The pivot pin 36, which connects the bunter and the link 37, is carried by an arm 44. This arm is mounted upon a rockshaft 45, the function of which need not be considered at present.

When the rockshaft 39 is turned in consequence of coaction of striker 34 and bunter 35, as hereinbefore explained, it actuates the mechanism shown by Figs. 9 to 12 inclusive. This rockshaft extends transversely from one end of the loom to the other, the mechanism shown by Figs. 2, 6 and 7 being near the left-hand end, and the mechanism shown by Figs. 9 to 12 being near the right-hand end. An arm 46 (Figs. 8 and 12) is affixed to rockshaft 39 and is pivotally connected to one member 47 of an adjustable link. This link includes two other members, indicated respectively at 48 and 49, the member 48 being in the form of a screw and having screw connection with 47. The rear end of the link 47, 48, 49 is pivotally connected to one arm of a bell-crank lever 50, which I will refer to hereafter as the pawl-lifter lever, on account of its pawl-lifting function. The fulcrum of this lever is indicated at 51.

The pawl which is lifted by lever 50 is indicated at 52. This pawl is one element of the mechanism by which the warp beam is rotated step by step to let off the warp members. See Fig. 10. The pawl coacts with the ratchet wheel 53 affixed to a shaft 54. The pawl is mounted upon a pivot pin 55, and this pin is carried by a swinging arm 56 hereinafter termed the pawl carrier. Arm 56 is mounted upon the shaft 54, but is loose with relation to the shaft so that no rotative movement will be transmitted by it directly to the shaft. The pawl carrier is oscillated by a cam 57 which is affixed to a shaft 58. I have not shown any mechanism for driving the shaft 58, and it will be sufficient to state that this shaft will rotate continuously in the direction indicated by an arrow in Fig. 10, so long as the driving clutch of the loom is connected to a source of power. The cam coacts with a roll 59 on an arm 60. The lower end of this arm is connected by a link 61 with the pawl carrier. A spring 62 keeps the roll 59 in contact with the cam and imparts return movement to the pawl carrier, the cam being effective for causing the driving stroke of the pawl carrier.

Rotation is transmitted from shaft 54 to a shaft 63 through bevel gears 64 and 65. (Figs. 10 and 11). Shaft 63 carries a worm 66, which is enmeshed with a gear 67. A pinion 68, rigidly connected to gear 67, is enmeshed with a gear 69 of the warp beam. The train of mechanism just described transmits motion from cam 57 to the warp beam to cause intermittent rotation of the latter to let off the warp members.

The warp members, passing from the warp beam, pass first over a whip roll 70, then over and under lease rods 71, 72 and 73. Rods 71 and 73 remain substantially stationary, but rod 72 is turned about its axis for the purpose of imparting the fell-reversing movement to the warp members. One end of rod 72 is mounted in a suitable socket member 74 (Fig. 11). This socket member is capable of oscillating and is mounted in a bearing 75. An arm 76 is affixed to the socket member for the purpose of turning the same in its bearing, the socket member and arm being adapted to operate as a wrench to turn the rod 72 about its axis. The cross section of rod 72 is substantially elliptic, and its major diameter is initially parallel to the path traversed by the warp members. It is normally held in this position by a spring 77 which is connected to arm 76, a backstop 78 being arranged to be engaged by the arm to determine the normal position of rod 72. The lower end of arm 76 is forked (see Fig. 11) and carries a roll 79. It also carries a pin 80, the latter being arranged above the roll. A rod 81 extends through the forked portion of arm 76 between the roll 79 and pin 80, and normally rests upon the roll. This rod has a hook 82 which is arranged to coact with the pin 80 when the rod is lifted, as will be understood after further description. The forward end of rod 81 is pivotally connected to the pawl carrier 56, and the rod consequently travels forward and backward in consequence of the movement imparted to the pawl carrier by the cam 57.

When the pawl-lifter lever 50 is actuated in consequence of failure or breakage of the filling, it disengages the pawl 52 from the ratchet wheel 53 and lifts the rod 81 into engagement with the pin 80. Pawl 52 has a laterally extending lug 83 which is arranged to be engaged by a curved surface 84 of the lever 50, said surface being arranged to be substantially concentric to the axis of shaft 54 when the lever 50 is in the position shown by Fig. 14. When the lever 50 is in the latter position, it holds the pawl out of engagement with the ratchet wheel, so that the pawl will have no effect in driving the warp beam.

Lever 50 has an extension 85 at its rear end. An arm 86, mounted upon a pivot pin 87, rests upon the extension 85. This arm carries a spring plunger 88 which is arranged to lift the rod 81 when the extension 85 rises. The spring 89 which coacts with the plunger takes care of over-travel of the arm 86, and enables the link 81 to have a compound curvilinear motion as required by the pawl carrier 56 and arm 76. The next forward movement of rod 81 will draw the arm 76 toward the front, against the tension of spring 77, and thus turn the socket member 74 to turn lease rod 72 to the position shown by Fig. 14, thus drawing the warp members, the fell, and the woven fabric, toward the rear. At this time the roll 23 (Fig. 1) rises sufficiently to permit the fell-reversing movement; and at the same time the warp beam remains stationary, the let-off mechanism having been rendered inoperative by the upward movement of the pawl-lifter lever. The fell is thus set back, the proportions and movement of lease rod 72 being such as to make the complete reverse movement of the fell equal to one step of the let-off, so that the last remaining pick of the old filling (the last pick having been removed) will be reset upon subsequently restarting the loom.

The operation of the pawl-lifter lever 50 occurs synchronously with the coaction of striker 34 and bunter 35, at which time the lay is completing its forward movement and the pawl carrier 56 is back as shown by Figs. 9 and 10. When the lever 50 has been moved to pawl-supporting position, it is held in such position by a latching device 90. (Figs. 8, 9 and 12.) The member 90 is in the form of a bell-crank and is mounted upon a pivot pin 91. It coacts with a lug 92 formed upon the link member 47. A spring 93 is arranged to throw the member 90 from the position shown by Figs. 9 and 12 to the position shown by Fig. 8. When the parts are in their initial position, as when the loom is weaving in the ordinary manner, the member 90 rests upon the lug 92; but when the link 47, 48, 49 is moved toward the front of the loom, the member 90 drops behind the lug 92 in position to retain the lug as the latter settles back with the rearward movement of the lay.

The latching movement of the member 90 sets a tripping device for subsequent operation. Such tripping device is shown by Figs. 8 and 12. A bunter 94 is affixed to a carrier 95 in position to coact with a striker 96 carried by the lay. The carrier 95 is connected by a pivot 97 to the latching member 90. The bunter 94 normally rests below the striker, as shown by Fig. 9; but when the latching device 90 is moved to latching position as shown by Fig. 8, it moves the carrier 95 to the rear, and such movement causes the forward end of the carrier to rise. The rising movement is caused by two coactive cam members 98 and 99 and by a compression spring 100. The rear end of member 98 is pivotally connected to carrier 95 by a pivot pin 101. Member 99 is affixed to the frame of the loom. Spring 100 bears against the carrier 95 and member 98. As the latching movement of member 90 occurs when the striker 96 is directly over the bunter 94, the upward movement of the latter is arrested by the striker 96, but the carrier 95 nevertheless completes its movement to the rear and thereby compresses the spring 100. The spring completes the upward movement of the carrier when the lay has receded sufficiently. The bunter, upon being released by the striker, is lifted by the spring 100 to the position indicated by dotted lines in Fig. 8, the bunter being thus brought into the path of the striker so that it will be subsequently engaged and carried forward by the striker. When the bunter is carried forward, it retracts the latching device 90 from the lug 92 and thus permits the link 47, 48, 49, and the pawl-lifter lever 50 to return to their normal positions, the weight of the rear portion of lever 50 being sufficient to cause such return movement. During the time between the latching of link 47, 48, 49 and the releasing thereof, the lay swings from its forward position to the rear and returns to its front position; and while it is so moving, the lease rod 72 is actuated to impart the fell-reversing movement as hereinbefore described.

The first rearward movement of link 81 following the release of lever 50 enables the lease rod 72 to resume its normal position in response to the tension of spring 77, and such return movement of the lease rod is equivalent to one let-off movement of the warp beam. I have therefore provided mechanism for holding the pawl 52 away from ratchet 53 through one cycle of the lay after the pawl is released by lever 50, to the end that the first let-off motion following a replenishing or correcting operation on the filling will be caused by the return movement of lease rod 72, without any let-off movement of the warp beam.

The mechanism for assuming control of the pawl after lever 50 is released is shown by Figs. 10, 13 and 14. The pawl is normally pressed toward the ratchet by a compression spring 102. The pawl has a finger 103 which is engaged by a latching device 104, as shown by Figs. 10 and 13, when the pawl is in ratchet-engaging position. The latching member 104 is mounted upon a pivot pin 105 carried by the pawl carrier 56, and is normally held against the end of finger 103 by a compression spring 106. When the pawl is lifted by lever 50, the finger 103 is carried forward beyond a shoulder 107 of the latching device, and the expansive action of spring 106 moves the latching device into latching position to carry the shoulder 107 behind finger 103 as shown by Fig. 14. Shoulder 107 does not become effective until the pawl is released by lever 50; but when such releasing occurs, finger 103 settles against shoulder 107 and the latching device 104 thus assumes control of the pawl to prolong the period during which the pawl is held out of ratchet-engaging position. While the pawl is held by the latching device, the carrier 56 swings to the rear and then swings forward, the let-off movement by the lease rod 72 occurring during the movement to the rear. The last-mentioned forward movement of the pawl carrier 56 results in tripping the latching member 104 to release the pawl. Such tripping movement is caused by a lug 108 formed upon lever 50. This lug is arranged to be engaged by a laterally extending lug 109 formed upon the latching device. When lug 108 is raised, as shown by Fig. 14, lug 109 may pass under it without contact, and it is only when lever 50 is in its initial or normal position, as shown by Figs. 9, 10 and 13, that the lug 108 stands in the path of lug 109. The latching device and pawl are represented by broken lines in Fig. 13, to show how lug 109 coacts with lug 108 to release the pawl, the pawl being shown as having been released and thrown against the ratchet by its spring 102. When the pawl has been released as last described, it becomes effective for turning the warp beam intermittently to let off the warp in the usual manner.

Mechanism now about to be described is automatically operated to disconnect the clutch which drives the loom. Relatively large or heavy looms do not stop as quickly as relatively small or light looms, owing to the greater momentum of the moving parts. In order, therefore, to stop a heavy loom at the desired position, it would be necessary to disconnect the driving clutch and apply the brake sooner than in the case of a light loom. The drawings show two forms of clutch-controlling mechanism, one of which acts sooner than the other, the said one being intended for heavy looms, and the other being intended for light looms.

Figs. 2 and 5 show clutch-and-brake mechanism which is used with both forms of controlling mechanism. The controlling mechanism for heavy looms is shown by Figs. 3, 6 and 7 and will be described first.

An arm 121 (Figs. 2 and 3) is affixed to rockshaft 45 and is arranged to engage the rear side of an arm 122 which is loosely mounted upon the rockshaft. In this form of mechanism the arm 44 is fastened to the rockshaft by a setscrew 120, wherefore the coaction of striker 34 and bunter 35 causes arm 121 to move arm 122 toward the front of the loom, against the stress of a compression spring 123 (Fig. 2). Arm 122 has a finger 124 arranged to engage and move a clutch-controlling handle 125. This handle is in the form of a lever and is mounted upon a fulcrum stud 126. The handle is fitted loosely upon the fulcrum stud so that it may rock to a limited extent from front to rear of the loom, as well as to swing angularly about the axis of the fulcrum stud. The handle 125, as shown by Figs. 2 and 3, is behind and in engagement with a shoulder 127, and when the handle is in this position, it keeps the clutch connected for driving the loom. When, however, the arm 122 moves toward the front, it dislodges the handle 125 from the shoulder 127, and the handle thereupon moves in response to the tension of the spring 128. The lower portion of the handle 125 has a hole 129, and this hole is occupied by the forward end of a lever 130. The rear end of 130 is mounted upon a pivot stud 131. This pivot stud, in conjunction with a pivot stud 132, supports a shipper 133. The shipper has an arm 138 which is embraced by coöperative screws 139 carried by lever 130. Shipper 133 is suitably connected to the driven member 134 of the clutch which drives the loom. This clutch, as shown, is of the friction type, and the complemental clutch member with which it coacts is indicated at 135. These two clutch members are mounted upon a shaft 136,—134 being loosely mounted upon the shaft, and 135 being keyed to the shaft. 134 is in the form of a pulley and is intended to be engaged by a suitable belt, not shown.

The handle 125, upon being dislodged from the shoulder 127 and actuated by spring 128, moves the shipper 133 to disconnect clutch member 134 from clutch member 135. Such movement of the shipper causes the operation of suitable brake mechanism, which need not be described in detail because similar mechanism is shown and described in my copending application aforesaid. For present purposes it will be sufficient to designate the brake mechanism as a whole by reference numeral 137 in Fig. 5.

From the foregoing it may be seen that the clutch may be disconnected and the brake applied substantially simultaneously with the coaction of striker 34 and bunter 35. This will allow the lay to have one complete stroke to the rear before it reaches the desired stopping position.

In the case of a light loom, the controlling mechanism shown by Fig. 4 may be used. The latter leaves the clutch connected while the lay is traversing part of its first back stroke following the coaction of striker 34 and bunter 35. It is necessary, however, to have the arm 44 free to swing without turning the rockshaft 45, and the setscrew 120 will therefore be unscrewed, but the mechanism shown by Figs. 2, 3, 6 and 7 will be used in conjunction with the mechanism shown by Fig. 4. Referring to Fig. 4,— when the rockshaft 39 is operated, a cam 110 affixed thereto lifts a lay catch 111 into the path of the lay. The lay catch is moved to the rear by the lay and is thus caused to actuate a rocking member 112 to which the catch is pivotally connected. The member 112 is mounted upon a pivot stud 113 and coacts with an arm 114. The latter is mounted upon the rockshaft 45 and fastened thereto by a setscrew 115. The movement thus imparted to the rockshaft is the equivalent of that imparted directly by the arm 44 under the conditions first explained, but the relative timing of the movement is later. The handle 125 is moved forward as in the first instance, by the arms 121 and 122.

The operation of the machine is as follows. Simultaneously with the coaction of striker 34 and bunter 35, the let-off mechanism is disconnected by the lifting of pawl 52, link 81 of the fell-reversing mechanism is raised, lever 50 is caught by latch 90, bunter 94 is raised and moved to the rear, and the driving clutch is disconnected provided arm 44 is fastened to rockshaft 45 in lieu of using the mechanism shown by Fig. 4. The lay then swings from front to rear in consequence of momentum, during which movement the fell-reversing mechanism is operated. If the mechanism shown by Fig. 4 is used in lieu of fastening arm 44 to rockshaft 45, the clutch-disconnecting operation will occur while the lay is swinging from front to rear as last stated. In either event, the loom will come to rest when the lay is at or near its rear position, and the fell-reversing movement will be incomplete. While the loom is at rest the attendant will remove the last pick of filling and will replenish or otherwise correct the filling, and then place the starting handle 125 in the position shown to connect the driving clutch. The last remaining pick of the old filling will be reset and then the first pick of new filling will be beaten up into the same position in the cloth as that formerly occupied by the removed pick. The fell-reversing movement is completed while the lay is resetting the last pick of old filling; and, when such beating-up operation has occurred, the lease rod 72 is returned to its initial position, thus letting off the warp to the same extent as though such let-off movement were caused by the pawl 52. When the lay first reaches its forward position following the period of rest, lever 50 drops but pawl 52 is caught by latch 104, the necessary let-off of the warp being caused by the return of lease rod 72 to its initial position. Pawl 52 therefore travels from front to rear and from rear to front after lever 50 drops, before being released by latch 104. Such release is the last operation necessary to restore the entire mechanism to its normal running position, and the loom may thereafter continue to operate in the usual manner until the filling again fails.

I claim:

1. In a loom, the combination with fabric-engaging means adapted to move to let back the fell, and warp let-off means, of filling-controlled means arranged to act on the warp between said let-off means and the fell to move the latter backward in consequence of failure or breakage of the filling.

2. In a loom, the combination with fabric-engaging means adapted to move to let back the fell, and warp let-off means, of a lease-rod, and filling controlled means arranged to turn said lease-rod to move the fell backward in consequence of failure or breakage of the filling.

3. In a loom, the combination with fabric-engaging means adapted to move to let back the fell, and warp let-off means, of a filling detector, and means controlled by said detector and arranged to displace the warp members transversely of their length to move the fell backward in consequence of failure or breakage of the filling.

4. In a loom, the combination with fabric-engaging means adapted to move to let back the fell, and warp let-off means, and operating mechanism therefor, of filling-controlled mechanism arranged to be operated by said operating mechanism to act upon the warp between said let-off means and the fell in consequence of failure or breakage of the filling, said filling controlled mechanism being arranged to move the fell backward.

5. In a loom, the combination with fabric-engaging means adapted to move to let back the fell, and warp let-off means, of a warp-engaging member arranged to engage the warp between said let-off means and the fell, operating mechanism arranged to be connected to said let-off means or to said warp-engaging member, to let off the warp or to pull back the fell, as the case may be, and filling-controlled means arranged to disconnect said operating mechanism from said let-off means and connect the former to said warp-engaging member in consequence of failure or breakage of the filling.

6. In a loom, the combination with fabric-engaging means adapted to move to let back the fell, and warp let-off means, of disconnectible operating mechanism therefor, a member arranged to act upon the warp between said let-off means and the fell to move the latter backward, filling-controlled mechanism arranged to disconnect said operating mechanism from said let-off means and to connect said operating mechanism with said member in consequence of failure or breakage of the filling, said member being operable by said operating mechanism to move the fell backward and to let off the warp, and means arranged to disconnect said operating mechanism from said member and to reconnect said operating mechanism with said let-off means after said member has moved the fell and let off the warp as aforesaid.

In testimony whereof I have affixed my signature, in presence of two witnesses.

WILLIAM S. SOUTHWICK.

Witnesses:
CHARLES MAYBERRY,
ROBERT EWART.